United States Patent Office 2,843,525
Patented July 15, 1958

2,843,525

INSULIN SYNTHETIC POLY-AMINO ACID COMPLEXES

Frank Arnold Robinson, Bethnal Green, London, Walter Dickinson, Nottingham, and Vladimir Petrow and Samuel Wilkinson, London, England, assignors to Allen & Hanburys Limited, London, Boots Pure Drug Company Limited, Nottingham, The British Drug Houses Limited, London, and The Wellcome Foundation Limited, London, England, all British companies No Drawing. Application January 23, 1953
Serial No. 333,012

11 Claims. (Cl. 167—75)

The present invention relates to improvements in preparations of insulin.

The pancreatic hormone, insulin, which is an essential hormone for the metabolism of carbohydrates in animals and human beings, is an important therapeutic agent for the treatment of the disorder diabetes mellitus in which there occurs a disturbance of carbohydrate metabolism which may arise from a state in which the natural secretion of insulin from the pancreas is impaired. The symptoms of the disorder are alleviated by making up for the lack of naturally secreted insulin by the injection of solutions of insulin obtained from the pancreas of animals.

If a solution of insulin itself is injected into a patient suffering from the symptoms of diabetes mellitus the effect is rapid but soon wears off. To provide preparations of insulin which have a longer time of action, thus relieving the patient of the necessity for making frequent injections, insulin has been combined with a basic protein such as a protamine or globin and in this combined form the protamine- or globin-insulin (which may also contain zinc) is found to have a more prolonged effect on injection. This is due to the fact that the protamine- or globin-insulin is of relatively low solubility in blood plasma and acts as a reservoir or depot slowly releasing available insulin into the blood stream. For this purpose the globin or protamine is obtained from natural sources.

In view of the importance of insulin as a therapeutic agent it is highly desirable to lay down exact criteria for the composition and purity of preparations made for pharmaceutical use, but in the case of preparations containing a natural protein, this is difficult to attain, as the proteins obtained from natural sources may differ considerably depending on the condition of the living organism from which they are obtained, the time from death at which the protein is extracted and the exact process of extraction.

It is another disadvantage of protein-insulin preparations that they cannot be mixed with soluble insulin to give preparations which have a dependably regular effect.

It is an object of the present invention to provide prolonged-acting insulin preparations in which these and other disadvantages of natural protein-insulin preparations are reduced or obviated.

The proposal has already been made to use synthetic polypeptides having up to 4 amino acid residues per molecule in combination with insulin. Such preparations however have found no use in medicine.

By the present invention there are produced, as therapeutically active prolonged-acting insulin preparations, complexes of insulin with synthetically produced polymers of certain amino acids having a basic polypeptide structure and consisting of a chain of amino acid molecules linked together by peptide linkages: such polymers (hereinafter referred to as "poly-amino acids") contain at least 8 and preferably 10 or 15 or more amino acid residues per molecule and are polymers of ornithine or lysine or those resulting from the guanidisation of these polymers and also co-polymers of ornithine and lysine, their guanidisation products and their co-polymers with each other or with another amino acid which is selected from valine, phenylalanine, leucine, iso-leucine and glycine. For the purpose of the present invention poly-ornithine, poly-lysine and poly-arginine are particularly suitable.

The poly-amino acids may be formed from the naturally-occurring L-amino acids, or from their optical isomers, the D-amino acids or from the racemic DL-amino acids as formed by synthetic processes. The synthetic poly-amino acids are probably not products of homogeneous structure, that is to say, they do not consist solely of molecules all having exactly the same number of linked amino acids. They will consist probably of mixtures of molecules of slightly differing chain length. Nevertheless, by choosing the reaction conditions, they can be made to have any desired mean chain length and they may be made under certain specified conditions from starting materials of any desired chemical purity to give products of such constant characteristics as it may be found desirable to specify from time to time for pharmaceutical purposes.

A method which may be employed for forming the poly-amino acids used in the process of the present invention includes a one-step polymerisation reaction performed on a suitable derivative of the amino acid, preferably an $\alpha$-N-carboxy anhydride, the free amino group in the $\omega$-position of lysine or ornithine being protected, for example by a carbobenzoxy radical. Methods for preparing polyamino acids in this manner have been previously described. In these published methods, poly-lysine and poly-ornithine are prepared by the following scheme described below with reference to poly-lysine.

Lysine (Formula I) is reacted with carbobenzoxy chloride to give $\alpha$:$\epsilon$-dicarbobenzoxylysine (Formula II, in which and in succeeding formulae "Cbzo" stands for the carbobenzoxy group $-O.CO.CH_2C_6H_5$) which is chlorinated by means of phosphorus pentachloride to give $\alpha$:$\epsilon$-dicarbobenzoxylysyl chloride (III) which passes to $\epsilon$-carbobenzoxy-$\alpha$-N-carboxy-lysine anhydride (IV).

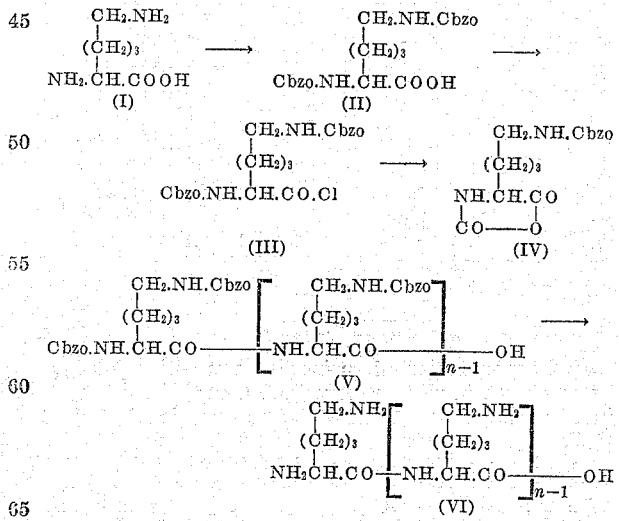

$\epsilon$-Carbobenzoxy-$\alpha$-N-carboxy-lysine anhydride (IV) is dissolved in a suitable solvent such as benzene and a one-step polymerisation process is initiated by the addition to the solution of a small quantity of water. The reaction gives poly-carbobenzoxylysine (V). This substance, on removal of the carbobenzoxy groups by any suitable method gives poly-lysine (VI).

Many modifications in the details of the method of synthesis outlined above are possible. For example the polymerisation may take place in solvents other than benzene for example pyridine, dioxane, ethylacetate or nitrobenzene and initiators other than water, for example ammonia or glycine dimethylamide can be used. The chain length of the polyamino acid may be controlled by the amount of initiator used. The polymerisation of the N-carboxy-anhydrides is an initiated chain polymerisation reaction in which the molecular weight should be determined by the relative concentrations of the monomer and initiator, at least for chain lengths up to 15 amino acid residues, and a polymer of approximately any desired chain length can be obtained by choosing the molecular ratio of monomer/initiator to be the desired chain length number.

The chain length of a given preparation may be estimated by methods which are already known, for example estimation of free amino groups in the product before removal of the blocking groups by the Van Slyke method, or the method employing dinitro-fluorobenzene.

Poly-ornithine may be prepared by an analogous method starting from ornithine. Poly-arginine may be prepared from poly-ornithine by the guanidisation of poly-ornithine hydriodide with a large excess of methyl isothiourea in methanol.

The preparation of the mixed polymers may be effected by co-polymerisation of an ω-carbobenzoxy-α-N-carboxy-anhydride of lysine, or ornithine with the α-N-carboxy-anhydride of valine, phenylalanine, leucine, iso-leucine or glycine in the same manner used for the preparation of the single amino acid polymers. Where ornithine is used, the product may be subjected to a guanidisation reaction. It has been found that such mixed polymers should contain not substantially less than 25 molar percent of lysine, ornithine or arginine.

The poly-amino acid salts such as the hydrohalide are soluble in aqueous liquids and therapeutically active insulin preparations thereof many be prepared by adding together an aqueous solution of insulin and an aqueous solution of the poly-amino acid salt (one or both of which solutions may contain a zinc salt) and both solutions being buffered to a suitable pH in the neighbourhood of the physiological pH, from which mixture the insulin-polyamino acid complex will be precipitated; suitably the pH of the preparation may lie between 5 and 8. The precipitate may be separated and used to form preparations for pharmaceutical purposes, or the mixed aqueous solutions containing the precipitated complex in suspension may be used as such. Where the insulin and polyamino acid are in substantially isophane ratio, the precipitate may be in crystalline form. The preparations may contain an antiseptic phenolic compound such as phenol or a cresol, substances such as sodium chloride or glycerol in order to produce isotonicity and any substances necessary to bring the solutions to any desired pH and to buffer them.

The invention will now be described with reference to the accompanying examples in which all temperatures are given in degrees centigrade.

EXAMPLE 1

In the preparation of an insulin composition 0.259 g. of crystalline insulin (potency 23.2 u/mg.) is suspended in 25 cc. of distilled water and the suspension is shaken to break up the aggregates of insulin crystals. To the suspension are added 2.4 cc. of 0.1 N hydrochloric acid to dissolve the insulin followed by 2.5 cc. of 1% solution of zinc chloride, 1.9 cc. of glycerol and 0.225 cc. of m-cresol. The volume of the solution is adjusted to 50 cc. To 10 cc. of the solution so obtained there is added 4.18 cc. of 0.025% solution of poly-L-lysine hydrochloride and the volume of the mixture is adjusted to 25 cc. The solution is treated with 5 cc. of M/15 sodium phosphate solution to which has been added sufficient phosphoric acid to give a pH value of 7.1 to the final insulin suspension. [The phosphate buffer contains 0.3% of m-cresol to inhibit the development of fungal growth.] There is thus obtained an isophane suspension containing 40 units of insulin per cc.

An insulin suspension containing 40 units per cc. and twice the isophane quantity of polylysine may be prepared in an identical manner to that described above but using 8.36 cc. of 0.25% polylysine hydrochloride solution.

The polylysine hydrochloride employed in the above preparations is prepared in the following manner.

41 g. of L-lysine monohydrochloride dissolved in 224 cc. of 2 N-sodium hydroxide is cooled to 0° C. in a freezing mixture. 137 g. of 85.5% w./w. benzyl chloroformate and 280 cc. of 4 N-sodium hydroxide previously cooled to 0° are each added in four portions, with vigorous shaking or stirring over ca. 20 mins., the temperature being kept below 10°. 400 cc. of 5 N-hydrochloric acid is added and the liberated oil collected in ether (3×200 cc.) and extracted from this solution with four successive portions each of 750 cc. of 7% potassium bicarbonate solution. The potassium bicarbonate extracts are acidified with 500 cc. of 5 N-hydrochloric acid and the oil re-extracted with ether (3×200 cc.) and dried over sodium sulphate. On removal of the ether in vacuo below 30° a viscous syrup of crude α:ε-dicarbobenzyloxy-L-lysine remains.

37 g. of the crude material dissolved in 145 cc. of dry ether is cooled and phosphorus pentachloride (22.0 g.) added in one portion. The mixture is swirled vigorously and after ca. 10 minutes a further portion of phosphorus pentachloride (ca. 3 g.) is added in order to ensure a large excess. After 25 minutes swirling, the solution is rapidly filtered and 25 cc. of dry ethyl acetate is added to the filtrate. The solvents are removed in vacuo with exclusion of moisture, first at 35° C. until the majority of the ether had been removed and then at 50° C. to remove ethyl acetate. The residue is heated at 50°/1–5 mm. for a few minutes by which time the anhydride has crystallised. 30 cc. of dry ether is added to the cooled residue which is allowed to stand at 0° C. for one hour. The anhydride is collected, washed with ether and recrystallised twice, as rapidly as possible, by dissolving in the minimum amount of hot, dry ethyl acetate and gradually adding light petroleum (B. P. 60–80°) to induce crystallisation. The anhydride is filtered and dried in vacuo to yield a solid M. P. 97–99°. The anhydride (8.15 g., recrystallised twice from ethyl acetate-light petroleum) M. P. 97–99° is dissolved in 350 cc. of dry boiling benzene and treated with 1.03 g. of water in 4 cc. of dry dioxan and refluxed for six hours. The polymer is filtered from the warm solution, washed with ether and dried in vacuo. (Found: amino nitrogen (Van Slyke) 0.49 i. e. chain length=10.5.)

6.5 g. of the powdered polymer is suspended in 325 cc. of glacial acetic acid at 45–50° C. with passage of dry hydrogen chloride for six hours. Crude poly-L-lysine hydrochloride is collected, washed with ether and dried in vacuo (4.2 g.). The dried material is dissolved in water (30 cc.) and the clear solution is washed with ether (10 cc.) and evaporated from a water-bath ($>80°$) to obtain poly-L-lysine hydrochloride $$[\alpha]_D^{17} - 72.8° (c=1.2 \text{ in water})$$

EXAMPLE 2

In the preparation of an insulin suspension containing 40 units per cc. and twice the isophane quantity of polylysine the procedure described in Example 1 is employed but 9.6 cc. of 0.25% poly-L-lysine hydrochloride solution are used.

The polylysine hydrochloride is prepared in the following manner: ε-Carbobenzyloxy-α-N-carboxy-L-lysine anhydride is prepared as described in Example 1. 4.5 g.

of the anhydride (M. P. 98–99.5° after two recrystallisations) in 160 cc. of boiling benzene is treated with 0.9 g. of glycine dimethylamide in 20 cc. of dioxan. The mixture is heated under reflux for 6 hours and the solid which separates is isolated by filtration, washed with ether and dried in vacuo. 2 g. of the powdered polymer (chain length=22 units by Van Slyke determination) is decarbobenzoxylated by treating with dry hydrogen chloride in 100 cc. of nitromethane at 45–50° C. for six hours. The crude hydrochloride which separates is isolated by filtration, washed with ether, dried in vacuo and dissolved in water. The aqueous solution is evaporated to dryness and the residue is dried in vacuo to obtain poly-L-lysine hydrochloride $[\alpha]_D^{21°} -60°$.

EXAMPLE 3

In the preparation of an insulin suspension containing 40 units/cc. and twice the isophane quantity of polylysine the procedure described in Example 1 is employed but 9.2 cc. of 0.25% poly-L-lysine hydrochloride solution are used.

The polylysine hydrochloride is prepared as described in Example 2 but 0.1 mol. of glycine dimethylamide is employed as initiator. The product has $[\alpha]_D^{17°} -64.4°$ and a chain length of 13 units as measured by Van Slyke determination on the intermediate carbobenzyloxy derivative.

EXAMPLE 4

In the preparation of an insulin suspension containing 40 units/cc. and twice the isophane quantity of polylysine the procedure described in Example 1 is employed but 8.4 cc. of 0.25% poly-L-lysine hydrochloride solution are used.

The polylysine hydrochloride is prepared as described in Example 2 but 0.033 mol. of glycine dimethylamide are employed as initiator. The product has $[\alpha]_D^{17°} -76.0°$ and a chain length of 42 units as measured by Van Slyke determination on the intermediate carbobenzyloxy derivative.

EXAMPLE 5

In the preparation of an insulin suspension containing 40 units/cc. and twice the isophane quantity of polylysine the procedure described in Example 1 is employed but 8.1 cc. of 0.25% polylysine hydrochloride solution are used.

The polylysine hydrochloride is prepared as described in Example 1 employing benzene containing 0.02% water in the polymerisation stage. The decarbobenzyloxylation is performed by passage of hydrogen chloride into an acetic acid solution of the carbobenzyloxy derivative for 24 hours. There is thus obtained poly-L-lysine hydrochloride which has $[\alpha]_D^{17°} -81.2°$ and a chain length of 100 units as measured by Van Slyke determination on the intermediate carbobenzyloxy derivative.

EXAMPLE 6

An insulin composition containing 40 units/cc. of insulin is prepared by the methods described in the previous examples employing poly-L-lysine hydrochloride (chain length=65 as determined by the Van Slyke method on the intermediate carbobenzyloxy derivative) which has been obtained using glycine dimethylamide as initiator as described in Example 2.

EXAMPLE 7

The procedure of Example 1 was followed to prepare an insulin preparation from polyornithine hydrochloride.

Polyornithine hydrochloride having a chain length of at least 10 was prepared as follows:

Dicarbobenzoxy-ornithine 25 gms. of DL-ornithine hydrobromide were dissolved in 125 cc. of 2 N caustic soda cooled in ice. 71.5 cc. of 2 N caustic soda solution were added and then 14.5 cc. of carbobenzoxy chloride and the solution was stirred until the temperature fell to 3° C. This procedure was repeated a further three times, until a total of 286 cc. of caustic soda and 58 cc. of carbobenzoxy chloride had been added. The mixture was stirred for thirty minutes at 5° C. and then made acid with 80 cc. of concentrated hydrochloric acid, added slowly with stirring. The precipitated oil was extracted with 500 cc. of ether, followed by a further 300 cc. of ether. The combined ether extracts were shaken with four separate portions, each 850 cc. of 7% w./v. potassium bicarbonate solution. The aqueous layer was made acid with 350 cc. of concentrated hydrochloric acid and the oil was extracted with two portions of ether, each of 400 cc. and containing 20 cc. of ethyl acetate.

The combined ether extracts were dried over magnesium sulphate, filtered and the solvent evaporated off under reduced pressure at 40° C. giving 57 gms. of crude solid. This was extracted with two 50 cc. portions of sodium-dried ether, giving 31.5 gms. of a white solid melting at 106–110° C.

Carbobenzoxy-N-carboxy-ornithine-anhydride 31.5 gms. of dicarbobenzoxy-ornithine were dissolved in 600 cc. of sodium-dried benzene at the boiling point and rapidly cooled to 25° C. 31.5 gms. of powdered phosphorus pentachloride were added and the mixture was shaken for a few minutes and cooled to 20° C. The liquid was filtered to remove excess phosphorus pentachloride, left at 5° C. for two hours and again filtered. The solid was washed with 40/60 light petroleum and dried under vacuum giving 12 gms. of yellow solid melting at 105–108° C.

Polycarbobenzoxy-ornithine 12 gms. of the anhydride were dissolved in 550 cc. of boiling benzene, treated with charcoal and filtered hot to give a colourless solution. 1.5 cc. distilled water were added and the solution was refluxed for four hours. It was then evaporated down to half its volume under reduced pressure and filtered. The solid was washed with 100 cc. of sodium-dried ether, filtered and dried under vacuum, giving 7.5 gms. of white material.

Polyornithine hydrochloride 7.5 gms. of polycarbobenzoxy-ornithine were powdered and placed in 425 cc. of dioxan at a temperature of 50° C. Dry hydrogen chloride was passed into the suspension for 6½ hours. The polymer first gelled and then dissolved and after about three hours the polyornithine hydrochloride began to be thrown out of solution. It was filtered off, washed with ether and dissolved in 100 cc. of distilled water. The solution was filtered, evaporated down to dryness and the residue triturated with acetone giving 3.0 gms. of white solid.

EXAMPLE 8

The procedure of Example 1 was followed to prepare an insulin preparation from polyarginine sulphate.

Polyarginine sulphate having a chain length of at least 10 was prepared as follows:

3.0 gms. of polyornithine hydrochloride were dissolved in 27 cc. of 0.880 ammonia, and 7.2 gms. of powdered S-methyl isothiourea sulphate were added to the cooled solution, which was placed in a fume cupboard to disperse the evil smelling vapour of methyl mercaptan formed during the reaction. The solution was left at room temperature for 24 hours and then dissolved in 400 cc. of 5% v./v. sulphuric acid, with warming if necessary. 10 gms. of flavianic acid in 70 cc. of warm water were added and the mixture left in a refrigerator overnight. The precipitate was filtered off and washed with two 50 cc. portions of saturated arginine flavianate aqueous solution and then with acetone.

The precipitate was dissolved in 300 cc. of 5% v./v. sulphuric acid and the flavianic acid extracted with three portions of butanol (200 cc., 150 cc., 150 cc.). The aqueous layer was made just alkaline to litmus with concentrated barium hydroxide solution, boiled, cooled and filtered. It was then made just acid to litmus with 2 N sulphuric acid and evaporated down to 150 cc., treated with charcoal, filtered and evaporated down to a syrup. Acetone was added to give a precipitate and the solvent was evaporated off, giving a solid residue. This was triturated with acetone, filtered and dried, giving 3 gms. of a white solid.

EXAMPLE 9

The procedure of Example 1 is used to prepare an insulin preparation from poly-(L-lysine: DL-ornithine) hydrochloride.

This polymer, having a chain length of at least 10, was prepared as follows:

8.35 g. (0.0273 M) of ε-carbobenzoxy-L-lysine-N-carboxy anhydride and 7.96 g. (0.0273 M) of δ-carbobenzoxy-DL-ornithine-N-carboxy anhydride were polymerized in the manner described in the preceding example to give 13.75 g. of poly-(ε-carbobenzoxy-L-lysine: δ-carbobenzoxy-DL-ornithine). 12.75 g. of this polymer were decarbobenzoxylated with HCl in acetic acid to give 5.5 g. of poly-(L-lysine: DL-ornithine) hydrochloride, $[\alpha]_D^{22}$ —36.8° and having an isophane ratio of 0.88 mgm./10 units insulin.

This polymer contained 50 moles percent of DL-ornithine.

EXAMPLE 10

The procedure of Example 1 was followed using poly (L-lysine: glycine) prepared as follows:

10.31 g. (0.0337 M) of ε-carbobenzoxy-L-lysine-N-carboxy-anhydride and 10.21 g. (0.101 M) of glycine-N-carboxy anhydride were polymerised to give 14.45 g. of poly-(ε-carbobenzoxyl-L-lysine: glycine). 13.4 g. of this polymer were decarbobenzoxylated with HCl in phenol to give 6.45 g. of crude poly-(L-lysine: glycine), from which 2.2 g. of water-soluble material were obtained $[\alpha]_D^{24}$ —58.1° and having an isophane ratio 1.58 mgm./10 units insulin.

This polymer contained 25 moles percent of L-lysine.

EXAMPLE 11

Poly-L-lysine zinc insulin

In the preparation of poly-L-lysine zinc insulin, 0.518 mg. of crystalline insulin (22.5 units/mg.) is dissolved in 4.8 ml. of 0.1 N hydrochloric acid. To this solution is added 5 ml. of an aqueous solution of zinc chloride containing 1 g. ZnCl₂ by weight in 100 ml. water, 4.8 g. of glycerol and 0.6 ml. of m-cresol and the mixture is adjusted to a final volume of 100 ml. by the addition of the required volume of water. 10 ml. of the solution so obtained is added to 7.7 ml. of an aqueous solution of poly-L-lysine hydrochloride containing 0.25 g. in 100 ml. water and the volume of the mixture is adjusted to 25 ml. The poly-L-lysine hydrochloride used in this example was prepared as described in Example 1. To the resulting mixture is added 5 ml. of M/15 disodium hydrogen phosphate solution to which has been added sufficient phosphoric acid to bring the pH of the final mixture to 7.1. The suspension of the precipitated poly-L-lysine zinc insulin so formed exhibits delayed insulin activity on injection.

EXAMPLE 12

Poly-DL-lysine zinc insulin

In the preparation of poly-DL-lysine zinc insulin, the procedure adopted is that described in Example 11, except that 7.8 ml. of an 0.25% (calculated on a weight/volume basis) aqueous solution of poly-DL-lysine hydrochloride (prepared from DL-lysine by methods analogous to those described above for poly-L-lysine) is employed in place of 7.7 ml. of an 0.25% solution of poly-L-lysine hydrochloride. The suspension of the precipitated poly-DL-lysine zinc insulin so formed exhibits delayed insulin activity on injection.

EXAMPLE 13

Poly-L-lysine zinc insulin

In the preparation of poly-L-lysine zinc insulin, 0.518 mg. of crystalline insulin (22.5 units/mg.) is dissolved in 4.8 ml. of 0.1 N hydrochloric acid, 0.9 ml. of m-cresol is added and the volume of the solution is adjusted to 100 ml. by the addition of water. To 10 ml. of the solution so obtained is added 3.1 ml. of an 0.25% (calculated on a weight/volume basis) aqueous solution of poly-L-lysine hydrochloride prepared as described in any of Examples 1 to 6. The volume of the solution is adjusted to 25 ml. by the addition of water and to the mixture is added 5 ml. of M/15 disodium hydrogen phosphate solution to which has been added sufficient phosphoric acid and sufficient sodium chloride so that the pH of the final mixture is 7.1 and the sodium chloride content is 4.56% (calculated on a weight/volume basis).

EXAMPLE 14

Poly-DL-lysine zinc insulin

In the preparation of poly-DL-lysine zinc insulin, the procedure adopted is that described in Example 13 using 5.4 ml. of an 0.25% solution of poly-DL-lysine hydrochloride in place of 3.1 ml. of an 0.25% solution of poly-L-lysine hydrochloride. The suspension of the precipitated poly-L-lysine zinc insulin so formed exhibits delayed insulin activity on injection. The poly-DL-lysine hydrochloride is prepared from DL-lysine by methods analagous to those described in Examples 1 to 6.

EXAMPLE 15

Poly-lysine zinc insulin

In the preparation of poly-lysine zinc insulin 0.173 g. of crystalline insulin (22.5 units/mg.) is dissolved in 1.6 ml. of 0.1 N hydrochloric acid. To this solution is added 1.66 ml. of 1% (calculated on a weight/volume basis) zinc chloride solution 1.6 ml. of glycerol and 0.2 ml. of m-cresol. The volume of the mixture is adjusted to 100 ml. by the addition of water. To 10 ml. of the solution so obtained is added 2.4 ml. of an 0.25% solution (calculated on a weight/volume basis) of polylysine hydriodide prepared as described in Example 1 for the hydrochloride. The volume of the mixture is adjusted to 25 ml. and to the final solution is added 5 ml. of an M/15 solution of disodium hydrogen phosphate to which has been added sufficient phosphoric acid so that the pH of the final mixture is 7.1.

EXAMPLE 16

In the preparation of poly-lysine zinc insulin the procedure described in Example 15 is adopted but the volume of 0.25% solution of polylysine hydriodide employed is 3.2 ml. in place of 2.4 ml. as used in Example 15.

EXAMPLE 17

Polylysine zinc insulin

Insulin (174.8 mg.) dissolved in the minimum quantity of N/10 aqueous hydrochloric acid is made up to 80 ml. with M/32 phosphate buffer. To the resulting solution is added:

Zinc chloride solution_____ 1 ml. containing 16.7 mg. anhydrous zinc chloride.
Tricresol _____ 0.2 ml.
Glycerol _____ 1.6 gm.
Sodium chloride_____ 9.0 mg.

A second solution containing polylysine hydriodide prepared as described in Example 1 for the hydrochloride (70.6 mg.) in 8 ml. phosphate buffer is prepared. The two solutions are mixed and quickly made up to 100 ml. The mixture is stored in a refrigerator before use.

The poly-lysine zinc insulin forms a bulky white precipitate, which settles to give a clear supernatant liquid. The precipitate becomes crystalline on standing. Polarographic examination of the supernatant fluid appears to indicate that precipitation of insulin is practically quantitative, a maximum of 1 unit/ml. remaining in solution.

Poly-lysine zinc insulin was suspended in the solution containing glycerol, tricresol, sodium chloride and zinc chloride. The amount of poly-lysine zinc insulin was such as to give a strength of insulin of 40 units/ml. There was also prepared a comparable solution containing 40 units/ml. of insulin itself in solution.

A ten-rabbit cross-over test was carried out on starved animals. The dose given was 0.035 ml./rabbit subcutaneously.

The blood sugar of each rabbit was determined individually before injection. Following injection a mean blood sugar estimation was obtained every hour for 6 hours by bulking the blood from animals in the same group.

The mean percentage blood sugar values of 10 rabbits for the two substances were as follows:

| Percent Blood sugar | 40 u./ml. solution | Poly-lysine zinc insulin suspension |
|---|---|---|
| Initial | 100.0 | 100.0 |
| 1 hour after injection | 46.9 | 66.7 |
| 2 hours after injection | 47.1 | 66.4 |
| 3 hours after injection | 63.2 | 64.2 |
| 4 hours after injection | 84.6 | 62.4 |
| 5 hours after injection | 96.6 | 65.8 |
| 6 hours after injection | 105.8 | 69.1 |

It will be seen that at the time when the standard has returned to its initial blood sugar level the polylysine zinc insulin suspension shows a value of 67%. Therefore, the preparation passes the test for prolonged action usually applied to protamine zinc insulin.

EXAMPLE 18

*Poly-ornithine zinc insulin*

A cresol glycerin water solution was prepared containing 2 ml. tricresol and 16 g. of glycerin per litre of water and in 25 ml. of this solution at pH 3.2 was dissolved 87 mg. of crystalline insulin (23 units/mg.), and 0.84 ml. of 1% zinc chloride solution at pH 3–4. 2.6 ml. of a 1.0% solution of polyornithine hydrochloride, prepared as described in Example 7 in cresol glycerin water were added to the zinc insulin solution, followed by 7 ml. of a 2.2% solution of sodium phosphate ($Na_2HPO_4 12H_2O$) in cresol glycerin water and the pH adjusted to 7.1 with sodium hydroxide. The volume was made up to 50 ml. This preparation contains 0.174% of insulin (40 units/ml.) and 0.052% of polyornithine hydrochloride.

On neutralization polyornithine zinc insulin was thrown down as a fairly bulky white precipitate resembling protamine zinc insulin.

EXAMPLE 19

*Poly-arginine zinc insulin*

The conditions of Example 18 were repeated using poly-arginine sulphate (prepared as described in Example 8) in place of poly-ornithine hydrochloride, in the same quantity, except that 3.0 ml. of a 1.0% solution of polyarginine sulphate were used.

The mean percentage blood sugar values of 5 rabbits expressed as a percentage of initial value were:

| Percent Blood sugar | 40 u/ml. Solution | Polyornithine Zinc Insulin | Polyarginine Zinc Insulin |
|---|---|---|---|
| Initial | 100.0 | 100.0 | 100.0 |
| 1 hour after injection | 47.2 | 54.1 | 54.2 |
| 2 hours after injection | 50.5 | 59.1 | 48.9 |
| 3 hours after injection | 61.8 | 63.3 | 51.2 |
| 4 hours after injection | 90.9 | 62.7 | 59.5 |
| 5 hours after injection | 102.5 | 73.0 | 73.0 |

It will be seen that at the time when the standard has returned to its initial blood sugar level both the polyornithine and polyarginine zinc insulin suspensions showed a value of about 70% so that both pass the test for prolonged action usually applied to protamine zinc insulin.

We claim:

1. A prolonged acting insulin preparation comprising a complex of insulin with a synthetic poly-amino acid, said poly-amino acid having at least eight amino-acid residues and being a polymer of an amino acid selected from the group consisting of lysine, ornithine and arginine.

2. A prolonged acting insulin preparation comprising a complex of insulin with a synthetic poly-amino acid having at least eight amino acid residues, said poly-amino acid being selected from the class consisting of poly-lysine, poly-ornithine, poly-arginine, co-polymers of lysine and ornithine and their guanidisation products, and their co-polymers with each other and with an acid selected from the group consisting of valine, phenylalanine, leucine, isoleucine and glycine.

3. A prolonged acting insulin preparation comprising a complex of insulin with a synthetic poly-amino acid having at least eight amino acid residues, said poly-amino acid being selected from the class consisting of poly-lysine, poly-ornithine, polyarginine, co-polymers of lysine and ornithine with each other, their guanidisation products and their co-polymers with each other and with an amino acid selected from the group consisting of valine, phenylalanine, leucine, isoleucine and glycine and containing at least 25% of acid residues of lysine, ornithine and arginine.

4. A prolonged acting insulin preparation comprising a complex of insulin with a synthetic poly-amino acid having at least eight amino acid residues, said poly-amino acid being copolymer of an amino acid selected from a first class consisting of lysine, ornithine and arginine with another amino acid selected from a second class consisting of valine, phenylalanine, leucine, isoleucine and glycine.

5. A prolonged acting insulin preparation comprising a complex of insulin with a synthetic poly-amino acid having at least eight amino acid residues, said poly-amino acid being a co-polymer of an amino acid selected from a first class consisting of lysine, ornithine and arginine with another amino acid selected from a second class consisting of valine, phenylalanine, leucine, isoleucine and glycine, said co-polymer containing at least 50 moles percent of an amino acid selected from said first class.

6. A prolonged acting insulin preparation comprising a complex of insulin with synthetic poly-lysine having more than eight amino acid residues.

7. An insulin preparation comprising, in combination, insulin, zinc and a synthetic poly-amino acid selected from the group consisting of poly-lysine, poly-ornithine and poly-arginine and having at least eight amino acid residues per molecule.

8. A prolonged acting insulin preparation comprising a complex of insulin with synthetic poly-ornithine having at least eight amino acid residues.

9. A prolonged acting insulin preparation comprising a complex of insulin with synthetic poly-arginine having at least eight amino acid residues.

10. A prolonged acting insulin preparation comprising, a combination, insulin, zinc and synthetic poly-lysine.

11. A prolonged acting insulin preparation comprising, a combination, insulin, zinc and synthetic poly-ornithine.

References Cited in the file of this patent

UNITED STATES PATENTS 2,592,447    MacDonald _____ Apr. 8, 1952

FOREIGN PATENTS 518,624    Great Britain _____ Mar. 4, 1940

OTHER REFERENCES

Bergmann et al.: J. Biol. Cem., vol. 3, 1935, pp. 245–260.

I. G. Farben, P. B. Report 34,279, Appl. (July 30, 1942); publ. in German Dec. 13, 1946.

UNITED STATES PATENT OFFICE
Certificate of Correction

Patent No. 2,843,525                                                                    July 15, 1958

Frank Arnold Robinson et al.

It is hereby certified that error appears in the printed specification of the above numbered patent requiring correction and that the said Letters Patent should read as corrected below.

Column 2, line 40, strike out "—O.CO.CH$_2$C$_6$H$_5$," and insert instead

—CO.O.CH$_2$C$_6$H$_5$— lines 55 to 59, formula (V) should appear as shown below instead of as in the patent:

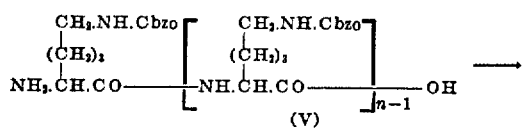

column 3, line 72, for "0.025%" read —0.25%—; column 4, line 27, for "dicarbobenzyloxy" read —dicarbo-benzoxy—; line 74, for "Carbobenzyloxy" read —Carbobenzoxy—; column 5, lines 26, 39, 51, 55, and 62, for "carbobenzyloxy", each occurrence, read —carbo-benzoxy—; same column 5, lines 49 and 50, for "decarbobenzyloxylation" read —decarbo-benzoxylation—; column 7, lines 20 and 21, 22, and 36 and 37, before "N-carboxy", each occurrence, insert —$\alpha$—; column 8, line 33, for "poly-L-lysine" read —poly-DL-lysine—.

Signed and sealed this 5th day of May 1959.

[SEAL]

Attest:
KARL H. AXLINE,
*Attesting Officer.*

ROBERT C. WATSON,
*Commissioner of Patents.*